UNITED STATES PATENT OFFICE.

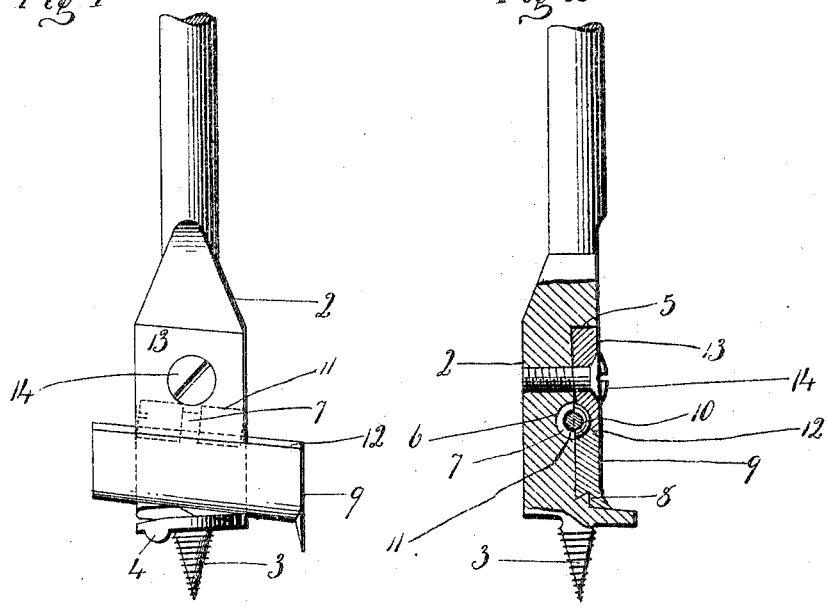

ARCHER B. JENNINGS, OF WALLINGFORD, CONNECTICUT.

EXPANSIBLE BIT.

950,782.          Specification of Letters Patent.          Patented Mar. 1, 1910.

Application filed August 14, 1909. Serial No. 512,838.

*To all whom it may concern:*

Be it known that I, ARCHER B. JENNINGS, a citizen of the United States, residing at Wallingford, in the county of New Haven and State of Connecticut, have invented a new and useful Improvement in Expansible Bits; and I do hereby declare the following, when taken in connection with the accompanying drawings and the letters of reference marked thereon, to be a full, clear, and exact description of the same, and which said drawings constitute part of this specification, and represent, in—

Figure 1 a front or plan view of an expansible bit embodying my invention. Fig. 2 a sectional side view of the same. Fig. 3 a rear view of the cutter detached. Fig. 4 a side view of the adjusting screw detached. Fig. 5 a side view of a bit illustrating a modified form of my invention.

This invention relates to an improvement in expansible bits, and bits of this type in which a sliding cutter is adapted to be adjusted by a screw mounted in the head and working in a rack formed on one surface of the cutter.

The object of the invention is to provide a bit in which the cutter may be adjusted by a screw, in which the cover is readily and securely clamped in its adjusted position, and a cutter which is cheap to manufacture; and the invention consists in the construction hereinafter described and particularly recited in the claims.

In carrying out my invention the bit-head 2 is formed with the usual gimlet screw point 3 and scoring lip 4. One side of the head 2 is flattened, and in this flat surface is a wide transverse groove 5, and in the bottom of this groove is a semi-circular channel 6 formed at its center with a semi-circular rib 7. The lower wall 8 of the groove is also preferably undercut. Arranged in this groove 5 is an adjustable cutter 9 of a length corresponding to the size of the hole to be cut. The upper edge of this cutter has a rear beveled edge 10 adapted to mesh with a screw 11 which is seated in the channel 6, the central portion of the screw being cut away to clear the rib 7 which serves to hold the screw against longitudinal movement. The outer upper edge 12 of the cutter is beveled the reverse of the beveled rack 10, and coacting with this surface of the cutter is a clamping plate 13 located in the upper portion of the groove 5 and held in place by a screw 14 which passes through it and into the head 2, and by which the clamping plate may be crowded against the cutter 9 so as to hold it when adjusted. By loosening the screw 14 the cutter may be adjusted by means of the screw 11. While I prefer to form the transverse groove 5 of uniform depth as such a cut could be made more conveniently, the upper portion of the groove may be of less depth than the lower portion, as shown in Fig. 5, so as to form two steps 15 and 16. At the junction of these steps is a channel 17 to receive the screw 11. The cutter is formed in the same way as above described, but the clamping plate 18 must have its lower edge 19 bowed to clear the screw 11 to engage with the upper forward edge of the cutter so as to clamp the cutter in its adjusted position. The same cutter may be used in both forms of my invention.

I claim:—

1. An expansible bit comprising a head having a transverse groove, a transverse channel in said groove, a screw mounted in said channel, a cutter arranged in the lower portion of said groove and having its upper rear edge beveled and provided with a rack to engage with said screw, the upper outer edge of said cutter also beveled, and a clamping plate located in the upper portion of said groove and adapted at its lower edge to coöperate with the outer upper edge of the cutter whereby the cutter may be clamped in its adjusted position.

2. An expansible bit comprising a head having a transverse opening of uniform depth, a semi-circular channel in said groove, a screw mounted in said channel, a cutter mounted in the lower portion of said groove and formed at its upper rear face with a rack to engage with said screw and with its upper outer face beveled, and a clamping plate in the upper portion of said groove and having its lower edge to coöperate with the beveled upper outer edge of the cutter.

In testimony whereof, I have signed this specification in the presence of two subscribing witnesses.

ARCHER B. JENNINGS.

Witnesses:
   FREDERIC C. EARLE,
   CLARA L. WEED.